Figure 1:
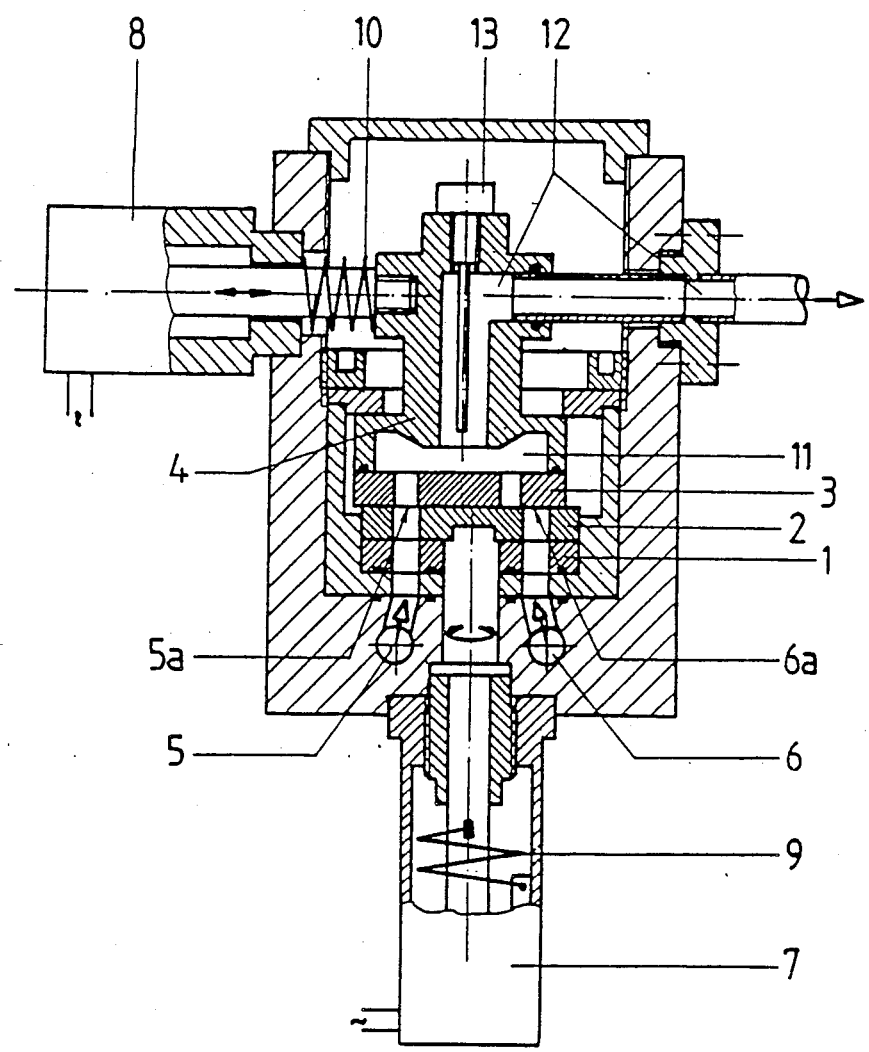

United States Patent [19]

Knebel et al.

[11] Patent Number: 4,674,678
[45] Date of Patent: Jun. 23, 1987

[54] MIXING FIXTURE FOR PLUMBING

[75] Inventors: Werner Knebel, Iserlohn; Günter Sieberhagen, Hagen, both of Fed. Rep. of Germany

[73] Assignee: Knebel & Rottger GmbH & Co., Fed. Rep. of Germany

[21] Appl. No.: 870,819

[22] Filed: Jun. 5, 1986

[30] Foreign Application Priority Data

Sep. 2, 1985 [DE] Fed. Rep. of Germany ....... 3531295

[51] Int. Cl.[4] ............................................. G05D 23/13
[52] U.S. Cl. .................................. 236/12.12; 137/605; 137/625.41; 236/12.16
[58] Field of Search .............. 236/12.11, 12.12, 12.16, 236/12.23; 137/896, 897, 605, 625.4, 625.41, 614.16

[56] References Cited

U.S. PATENT DOCUMENTS

| | | | |
|---|---|---|---|
| 3,322,342 | 5/1967 | Veale | 236/12.12 |
| 3,721,386 | 3/1973 | Brick et al. | 137/625.41 X |
| 3,987,819 | 10/1976 | Scheuermann | 137/625.41 X |
| 4,327,758 | 5/1982 | Uhlmann | 137/625.41 X |
| 4,349,149 | 9/1982 | Humpert | 236/12.16 |
| 4,407,444 | 10/1983 | Knebel et al. | 137/625.41 |
| 4,558,817 | 12/1985 | Kiendl | 236/12.12 |
| 4,611,757 | 9/1986 | Saether | 236/12.12 |

FOREIGN PATENT DOCUMENTS 2108634 5/1983 United Kingdom .......... 137/625.41

Primary Examiner—William E. Tapolcai
Attorney, Agent, or Firm—Jacobs & Jacobs

[57] ABSTRACT

To simplify and improve the functioning of a plumbing mixing fixture with a hot and cold water intake, a mixing chamber, and a mixing water outlet, in which the quantity of the flow and the mixing temperature are regulated by means of valve discs that can be adjusted by motor, a multi-disc mixing valve that adjusts both the quantity and the mixing temperature one after another is installed.

9 Claims, 4 Drawing Figures

MIXING FIXTURE FOR PLUMBING

The invention concerns an electronically adjustable mixing fixture for plumbing, with one hot and one cold water inlet, a mixing chamber, and a mixing water outlet, the flow and the mixing temperature being adjusting by means of valve discs that can be halted by means of a motor.

In German Patent Application No. P 35 18 644.5 old series, on which the invention is based, a mixing fixture of the aforementioned type for plumbing is disclosed. It provides for regulation of flow and mixing temperature by means of one inlet valve for each, constructed as a rotating disc valve, which said inlet valve is described in, for example, German patent disclosure No. 30 41 779.

However, it presents the disadvantage that the values of the regulators in each of the two valves influence the flow and the mixing temperature. It follows therefrom that the expenditure for adjusting the proportions of the opening sections of the two valves in order to maintain flow and mixing temperature at a constant level is comparatively high, and hence the breakdown rate of such an arrangement is considerable.

Thus the aim of the invention is to improve a mixing fixture of the type described more fully herein in such manner that the mixing fixture can be simplified and a surer operation than was previously the case can be obtained while maintaining the advantages of the state of the art already reached.

The achieving of this aim is characterized by the fact that a multi-disc mixing valve is installed that adjusts both the flow and the mixing temperature one after the other.

The result is not only a simplifying of the mixing fixture itself, since only one valve housing need be provided, but also a simplifying of the control for maintaining a steady flow in each position of the mixing temperature control element, because the control elements for leading in the flow and for adjusting the mixing temperature are positioned in a line, directly behind one another, in the direction of the flow of the medium.

A preferred embodiment, in which the motor regulators that act on the valve discs are allocated to energy storage units that adjust the control discs in the starting position when the regulators are not in action, characterized by the facts that the multi-disc mixing valve consists of a fixed-housing disc with two control ducts and two control discs that can be adjusted to the control ducts and which have two control ducts each, the hot or cold water flows into the control ducts of the fixed-housing discs, the discs are positioned one behind the other in the direction of the flow of the medium, the first control disc rests in watertight manner on the stationary disc and the second control disc rests in watertight manner on the first control disc; that the first control disc is designed to regulate the amount of flow and the second control disc is designed to regulate the mixing temperature, the control ducts of the second control disc empty into the mixing chamber, one stationary regulator engages on each of the two control discs, in addition, the control ducts are positioned in such manner that one regulator releases the hot and cold water flow over the first disc while the other regulator opens the hot water flow over the second control disc and at the same time closes the cold water flow.

In order further to diminish the effort of adjustment, it is advantageous if the cross-section of the opening for the hot and cold water intake is the same in each position of the control discs that adjust the mixing temperature.

The control discs are positioned in the housing in such a way that they can move in a rotational or translational manner.

A preferred embodiment of the aforementioned object, one that is particularly propitious for the manufacturing process, is one in which the first control disc can move in a rotational manner, while the second control disc can be adjusted in a translational manner, while appropriate regulators are allocated to the control disc.

In addition, this makes possible a particularly compact mixing fixture.

Advantageous embodiments of the energy storage units are described hereinafter.

To prevent loss of water and also the danger of hot-water scalding, it is advantageous if, when the regulator drive mechanisms break down or stop functioning, the energy storage units cause an automatic return movement of the flow control disc to closed position of the hot and cold water inlet and an automatic return movement of the mixing temperature control disc to closed position of the hot water profile section.

One variant that is preferred in certain circumstances is characterized by the fact that the operational closing of the hot and cold water flow for flow adjustment and the operational closing of the hot water passage with simultaneous opening of the cold water passage for mixing water temperature control is also done by the regulators, and only the automatic closing is done by the energy storage unit, if the return activity of the energy storage unit would be technically disadvantageous.

In order to prevent inaccuracies in measuring the temperature of the mixing water as a result of insufficient mixing, provision should be made for installation of at least one temperature sensor in the mixing chamber, particularly near the outlet opening of the mixing chamber.

For further improvement of constant maintenance of the selected adjustment figures, it is advantageous if provision is made for one pressure sensor each for pressure and/or differential pressure measurement in the hot and cold water inflow and mixing water outflow.

To improve ease of use, it is advantageous if, when the fixture is automatically shut off, at least cold water can be obtained by means of a manually operated bypass valve.

In the event of a disruption in the mixing fixture, this will permit the drawing of cold water at will, so that despite the disruption a minimal functioning of the mixing fixture can be maintained.

A particularly simple way of moderating the temperature of the mixing water is to provide a feedback control system for adjusting the mixing water temperature, in which said system the actual temperature of the mixing water is compared with the pre-selected target temperature by means of a control algorithm, from which the value can be derived for the regulator, preferably with a PID controller being provided in addition as a control algorithm.

To improve steady maintenance of the quantity of flow without an obligation to measure the flow itself, it is advantageous if a control circuit is provided for keeping the flow at a constant level, by means of which said control circuit a value can be derived for the regulator that affects the first control disc by means of a value communicator, using a pre-selected flow quantity, in which case the value for the aforementioned regulator can be corrected in accordance with the value for the other regulator by means of a multiplier.

However, this requires time-constant and equal flow pressures in the cold and hot water flows.

In the case of variable and differing medium pressures in hot and cold water flows, in order to maintain flows at a constant level without measurement of the flow quantity itself, it is advantageous if a control circuit is provided for maintaining the flow at a constant level, with which said control circuit a value can be derived for the regulator from a pre-selected flow and using a value communicator, the value for the regulator being correctable depending on the operational pressure differences between warm and hot water intake vis-à-vis the mixing water output and the value for the regulator by means of a function communicator and a multiplier.

Another possibility for maintaining a constant flow level is characterized by the fact that the flow can be maintained at a constant level by measuring partial flows in the hot and cold water intake or the total flow in the mixing water output.

Embodiment examples of the invention are shown in the drawings and are described below in greater detail.

Figure 2:
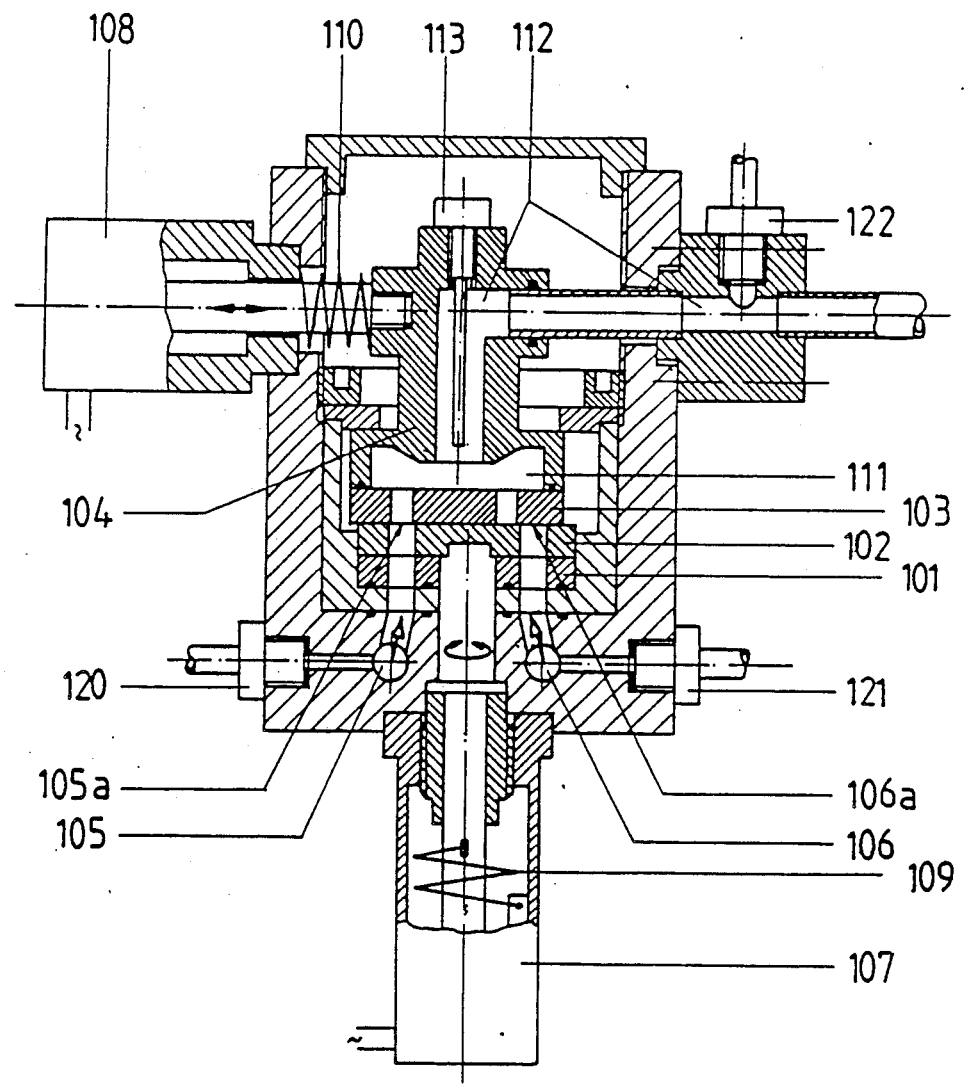
Figure 3:
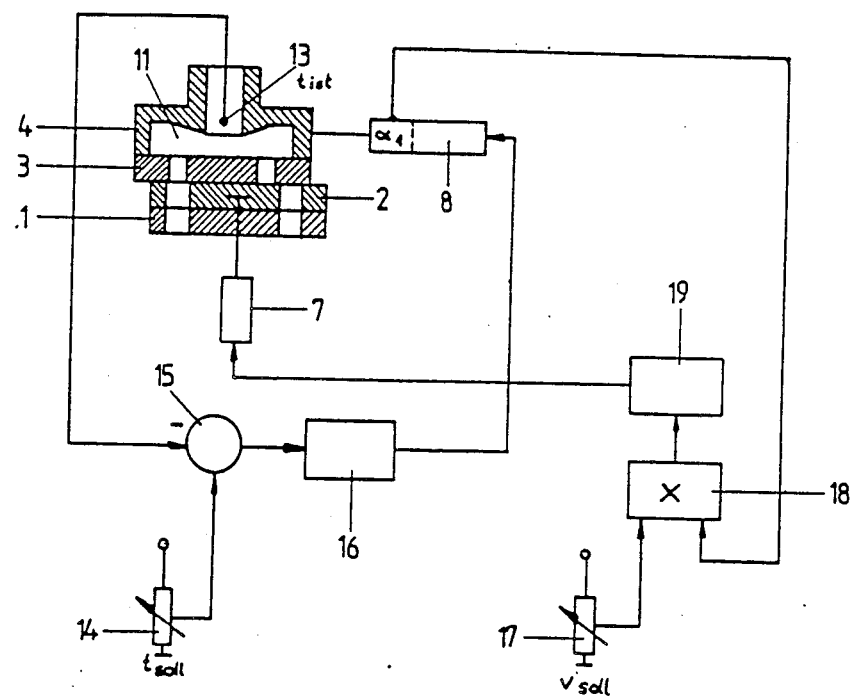
Figure 4:
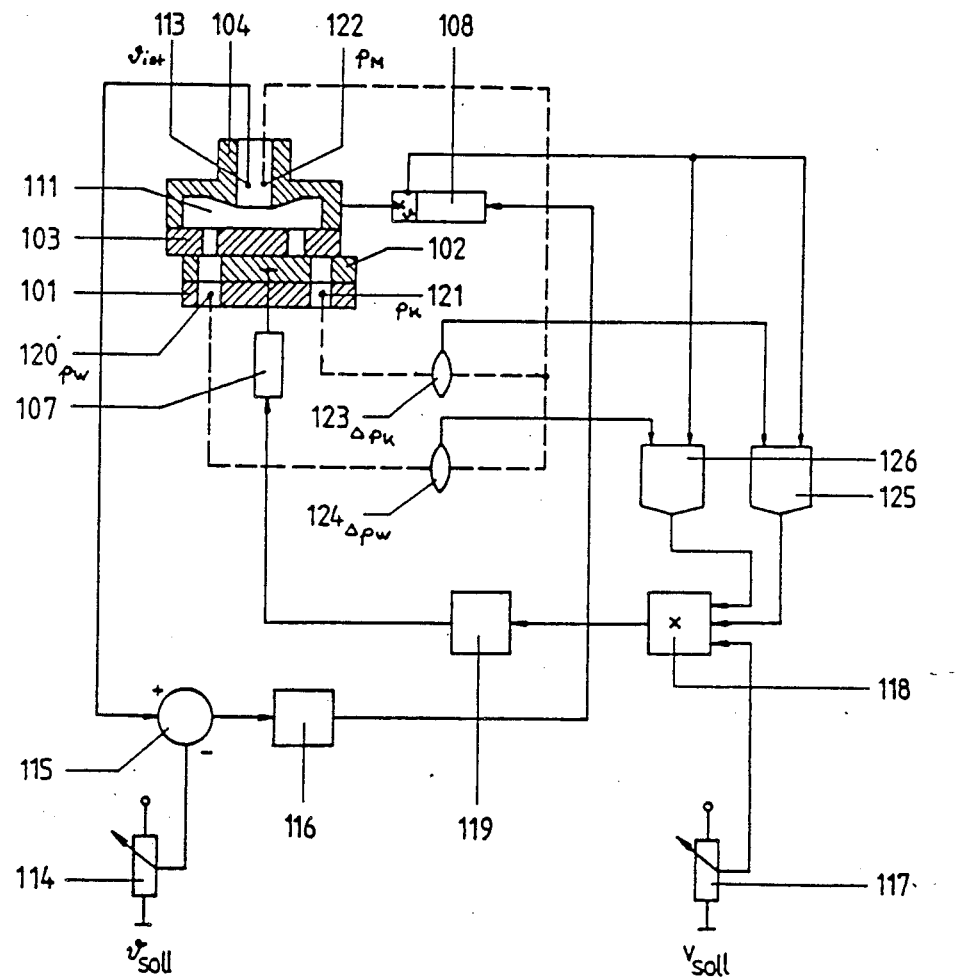

The drawings show:

FIG. 1: A lengthwise section of a mixing fixture;

FIG. 2: A lengthwise section of another embodiment:

FIG. 3: A connection diagram of the mixing fixture according to FIG. 1 for deducing the value;

FIG. 4: The same, for the mixing fixture shown in FIG. 2.

Common to both embodiments is a disc 1 or 101 immovably fixed in a housing, a first control disc 2 or 102, and a second control disc 3 or 103. Provision is also made for a mixing chamber housing 4 or 104 behind the discs in the direction of flow of the medium. In addition, a hot water intake 5 or 105 and a cold water intake 6 or 106 are installed in the housing.

Each of the discs 1, 2, 3, 101, 102, and 103 has two control ducts positioned parallel to the axis. Hot and cold water intakes 5, 6 or 105, 106 empty into the control ducts of discs 1 or 101.

The aforementioned discs, which for example can be made of ceramic, are positioned on top of one another in watertight fashion, with control disc 2 or 102 being supported on disc 1 or 101 and control disc 3 or 103 being supported on disc 2 or 102.

Control disc 2 or 102 can be turned in relation to disc 1 or 101 and to control disc 3 or 103, while control disc 3 or 103 can slide translationally relative to control disc 2 or 102.

A motor regulator 7 or 107 that performs rotating movements is allocated to control disc 2 or 102. A motor regulator 8 or 108 that acts translationally engages with control disc 3 or 103. Both regulators are fixed in stationary position.

Control disc 2 or 102 is designed to regulate flow, while the mixing temperature can be adjusted with control disc 3 or 103. To regulate flow, control disc 2 or 102 is twisted out of closed position relative to disc 1 or 101 by means of regulator 7 or 107, whereupon the control ducts of control disc 2 or 102 are positioned more or less opposite the control ducts of disc 1 or 101, and the hot or cold water flows are at the same time evenly released. In addition, in both discs 1 and 2 or 101 and 102, the control ducts are positioned diametrically and are on the same pitch circle diameter.

To adjust the mixing temperature, control disc 3 or 103 is slid translationally relative to control disc 2 or 102 of regulator 8 or 108.

In starting position, one control duct of control disc 3 or 103 faces cold water inlet 6 or 106 concentrically, while the other control duct of control disc 3 or 103 is closed by control disc 2 or 102, because the interval between the control ducts of control disc 3 or 103 is smaller by more than one diameter of a control duct vis-à-vis the interval of the control ducts of control disc 2 to 102. Thus when the hot water passage is opened, at the same time the cold water passage is closed by regulator 8 or 108.

An energy storage unit 9, constructed as a torsion bar, is allocated to regulator 7, and an energy storage unit 10, constructed as a pressure spring, is allocated to regulator 8, which said storage units automatically block the control discs allocated to them in the starting position when regulator 7, 8 or 107, 108 breaks down.

In FIGS. 1 and 2 the hot water passage is opened fully in both cases, while the cold water passage is blocked by control disc 3 or 103, so that in this case only hot water reaches mixing chamber 11 or 111 and thence goes into outlet 12 or 112.

Mixing chamber 4 is connected to outlet 12 in watertight fashion and can slide axially.

In addition, a temperature sensor 13 or 113 is clamped to mixing chamber housing 4 or 104, which said temperature sensor 13 or 113 projects into the outlet of mixing chamber 11 or 111.

According to the drawing, a pressure sensor 120, 121, and 123 is installed in both the hot and cold water intakes 105 or 106 as well as in the mixing water outlet 112.

According to the circuit shown in FIGS. 3 and 4, the actual temperature measured in mixing chamber 11 or 111 is compared with the target temperature preset in 14 or 114 by means of a subtractor 15 or 115, and a PID controller 16 creates factor $\alpha_1$ for regulator 8 or 108 out of the adjustment discrepancy. Factor $\alpha_2$ for regulator 7 is determined from factor $\alpha_1$ and from a control signal $\alpha$ proportional to the total flow quantity by means of a multiplier 18 or 118 and a factor communicator 19 or 119.

The target flow quantity is adjusted by means of adjuster 17.

According to FIG. 4, provision is made for a control circuit to maintain a steady flow, which said control circuit includes a multiplier 118, a factor communicator 119, two pressure difference sensors 123 and 124, and two function communicators 125 and 126. With this control circuit, a factor can be determined for regulator 107 from a preselected quantity by factor communicator 119, whereupon the factor of regulator 107 can be corrected based on the operational pressure differences between hot and cold water intake 105, 106 and mixing water output 112 as well as the factor for regulator 108 by means of function communicator 125 and 126 and multiplier 118.

Element 117 is provided for adjustment of the target flow.

All new individual and combination characteristics disclosed in the description and/or drawing are deemed essential to the invention.

What is claimed is:

1. An electronically adjustable plumbing mixing fixture having one hot and one cold water intake, a mixing water outlet in which the volume of flow and the temperature mixing are regulated and means for effecting such water regulation of flow and temperature comprising motor adjustable valve discs, a multi-disc mixing valve being provided in said fixture for adjusting flow volume and mixing temperature sequentially in which, the motor adjustable regulators acting on the valve discs having energy storage units for blocking the control discs in their starting position when the regulators are not in operation, and the multi-disc mixing valve including a stationary disc provided with two control ducts and two control discs which can be adjusted with respect to each other, the control discs having two control ducts, so that the cold or hot water intakes empty into the control ducts of the stationary disc, the discs being installed one behind the other in the direction of flow of the water, with the first control disc resting in watertight fashion on the stationary disc and the second control disc resting in watertight fashion on the first control disc being designed to adjust the water flow and the second control disc being designed to control mixing temperature, the control ducts of the second control disc discharging into the mixing chamber, a fixed stationary regulator engaging on each of the two control discs and the control ducts being installed in such manner that one regulator releases the cold and hot water inlet through the first control disc while the other regulator opens the hot water passage by means of the second control disc and at the same time closes the cold water passage, the cross-section of the opening of the hot and cold water intake being the same in each adjustment position of the control disc that regulates the mixing temperature, and the control discs being mounted for movement in a rotary or translational manner in which the first control disc is movable in rotary manner and the second control disc is slidable in a translational manner, appropriate regulators being provided for the control discs, the energy storage units comprising a spring or torsion bar for rotary movements and a pressure spring for translational movements, whereby in the event of a breakdown or interrruption of the drive of the regulators, the energy storage units cause an automatic return movement of the control disc that controls the flow to the closed position of the hot and cold water inlet and an automatic return movement of the control disc that controls the mixing temperature to the closed position of the hot water profile section, the regulators operationally closing the hot and cold water intakes for flow adjustment and operationally closing the hot water passage at the same time that the cold water passage for adjustment of the mixing water temperature is opened, the energy storage units effecting only the automatic closing.

2. Mixing fixture according to claim 1, in which provision is made for the purpose of measuring temperature for at least one temperature sensor installed in the mixing chamber in the area of the outlet opening of said mixing chamber.

3. Mixing fixture according to claim 1, in which one pressure sensor each is installed in hot and cold water intake and the mixing water outlet in order to measure pressure and/or differential pressure.

4. Mixing fixture according to claim 1, in which a manually operated bypass valve is provided in case the fixture is automatically turned off so that at least cold water can be obtained.

5. Mixing fixture according to claim 1, in which in order to adjust the mixing water temperature an adjustment circuit is provided with which the factor for the regulator can be derived after comparison of the actual temperature of the mixing water with the preselected target temperature by an adjustment algorithm.

6. Mixing fixture according to claim 5, in which a PID controller is the adjustment algorithm.

7. Mixing fixture according to claim 1, in which, in order to maintain a steady flow, control circuit means by which a factor for the regulator acting on the first control disc can be derived from a preselected flow by a factor communicator, the factor for the said regulator being correctable by a multiplier based on the factor for the other regulator.

8. Mixing fixture according to claim 1, in which in order to maintain a constant flow a control circuit is provided with which a factor for the regulator can be derived from a preselected flow by a factor communicator, the factor for said regulator being correctable based on the operational pressure differences between the hot and cold water intakes vis-a-vis the mixing water outlet and the regulator factor of the function communicator and a multiplier.

9. Mixing fixture according to claim 1, in which the quantity of flow is maintained at a constant level by measuring the partial flows in the hot and cold water intake or the total flow in the mixing water outlet.

* * * * *